US009105911B2

(12) United States Patent
Byun et al.

(10) Patent No.: US 9,105,911 B2
(45) Date of Patent: Aug. 11, 2015

(54) BATTERY MODULE

(75) Inventors: Sang-Won Byun, Yongin-si (KR);
Yong-Sam Kim, Yongin-si (KR);
Sung-Bae Kim, Yongin-si (KR);
Yong-Shik Hwang, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 603 days.

(21) Appl. No.: 12/791,693

(22) Filed: Jun. 1, 2010

(65) Prior Publication Data

US 2011/0159353 A1   Jun. 30, 2011

Related U.S. Application Data

(60) Provisional application No. 61/290,483, filed on Dec. 28, 2009.

(51) Int. Cl.
| H01M 2/20 | (2006.01) |
| H01M 2/22 | (2006.01) |
| H01M 2/24 | (2006.01) |
| H01M 2/30 | (2006.01) |
| H01M 6/42 | (2006.01) |

(52) U.S. Cl.
CPC .............. *H01M 2/206* (2013.01); *H01M 2/202* (2013.01); *H01M 2/22* (2013.01); *H01M 2/24* (2013.01); *H01M 2/305* (2013.01); *H01M 6/42* (2013.01)

(58) Field of Classification Search
CPC ....... H01M 2/202; H01M 2/206; H01M 2/22; H01M 2/24; H01M 2/305; H01M 2/307

USPC .................................. 429/158, 160, 178, 179
See application file for complete search history.

(56) References Cited

U.S. PATENT DOCUMENTS

| 6,455,190 B1 * | 9/2002 | Inoue et al. .................... 429/160 |
| 2003/0077508 A1 * | 4/2003 | Asahina et al. ............... 429/160 |
| 2006/0094289 A1 * | 5/2006 | Kim et al. ..................... 439/500 |
| 2006/0145657 A1 | 7/2006 | Hashida et al. |
| 2008/0063929 A1 * | 3/2008 | Byun et al. .................... 429/121 |
| 2009/0075163 A1 | 3/2009 | Shevock et al. |

(Continued)

FOREIGN PATENT DOCUMENTS

| CN | 101841056 A | 9/2010 |
| EP | 1 505 670 A2 | 2/2005 |

(Continued)

OTHER PUBLICATIONS

Office Action dated Apr. 27, 2012 issued in European Patent Application No. 10 174 581.8, 4 pages.

(Continued)

*Primary Examiner* — Eugenia Wang
(74) *Attorney, Agent, or Firm* — Christie, Parker & Hale, LLP

(57) ABSTRACT

A battery module includes a plurality of battery units, each including an electrode assembly and an electrode terminal electrically connected to the electrode assembly; a bus bar connecting the electrode terminal of a first battery unit of the plurality of battery units and the electrode terminal of a second battery unit of the plurality of battery units; and a position arrangement unit configured to maintain a position of the bus bar relative to the electrode terminals of the first and second battery units.

18 Claims, 14 Drawing Sheets

(56) References Cited

U.S. PATENT DOCUMENTS

| | | |
|---|---|---|
| 2010/0167094 A1 | 7/2010 | Geshi et al. |
| 2010/0173178 A1 | 7/2010 | Kim et al. |

FOREIGN PATENT DOCUMENTS

| | | |
|---|---|---|
| EP | 2 204 863 A1 | 7/2010 |
| JP | 2007-323952 | 12/2007 |
| JP | 2008-098012 A | 4/2008 |
| JP | 2009-070822 | 4/2009 |
| JP | 2009-277605 | 11/2009 |
| KR | 10-2006-0074891 | 7/2006 |
| WO | WO 2008/149546 A1 | 12/2008 |

OTHER PUBLICATIONS

Extended European Search Report dated Oct. 28, 2010, for corresponding European Application No. 10174581.8.

European Communication dated Apr. 6, 2011, for corresponding European Patent application 10174581.8.

English Language Translation of KIPO Office action dated Jul. 28, 2011, for corresponding application No. 10-2010-0069602 (2 pgs.).

Patent Abstracts of Japan, and English machine translation of Japanese Publication 2009-277605, (18 pages).

English translation of Japan Office action dated Nov. 27, 2012, for corresponding Japanese Patent Application No. 2010-276153 (4 pgs.).

Patent Abstracts of Japan, and English machine translation of Japanese Publication 2007-323952 dated Dec. 13, 2007, listed above, (24 pages).

SIPO Office action dated Mar. 5, 2014, with English translation, corresponding to Chinese Patent application 201010622220.X, (22 pages).

English Translation of JPO Office action dated Jun. 11, 2013 for corresponding Japanese Patent application No. 2010-276153 (3 pgs.).

SIPO Office action dated Aug. 18, 2014, with English translation, for corresponding Chinese Patent application 201010622220.X, (7 pages).

Patent Abstracts of Japan, and English machine translation of Japanese Publication 2009-277605, (18 pages), This machine translation has the same date as the corresponding JP Publication, above: Nov. 26, 2009.

* cited by examiner

BATTERY MODULE

CROSS-REFERENCE TO RELATED APPLICATION

This application claims priority to and the benefit of U.S. Provisional Patent Application No. 61/290,483, filed on Dec. 28, 2009 in the United States Patent and Trademark Office, the entire content of which is incorporated herein by reference.

BACKGROUND

1. Field

Aspects of embodiments of the present invention relate to a battery module in which a plurality of batteries are electrically connected.

2. Description of the Related Art

Unlike primary batteries, secondary batteries generally may be rechargeable. A secondary battery may be used as an energy source, such as for mobile devices, electric automobiles, hybrid automobiles, electric bicycles, and uninterruptible power supplies. Depending on the types of external devices in which batteries are used, such secondary batteries may be used in the form of a single battery or in the form of a battery module in which a plurality of batteries are electrically connected and are packaged as one unit.

Small-sized mobile devices such as mobile phones may operate with an output and capacity of a single battery for a predetermined amount of time. On the other hand, battery modules are usually used in motor-operated bicycles requiring high power and in hybrid electric motor vehicles that need to be driven with high power for a long period of time since battery modules provide higher output power and higher capacity batteries. Battery modules are capable of increasing an output voltage or an output current according to the number and connection structure of batteries arranged in the battery modules.

Typically, such battery modules achieve a required output voltage or current by connecting a plurality of batteries in series or in parallel.

SUMMARY

According to an aspect of embodiments of the present invention, a battery module in which a plurality of batteries are to be connected is capable of maintaining the correct positions of bus bars and improving welding efficiency when the bus bars are welded due to a position arrangement unit configured to regulate a position where the bus bars for electrically connecting adjacent batteries are assembled.

According to one embodiment of the present invention, a battery module includes a plurality of battery units, each including an electrode assembly and an electrode terminal electrically connected to the electrode assembly; a bus bar connecting the electrode terminal of a first battery unit of the plurality of battery units and the electrode terminal of a second battery unit of the plurality of battery units; and a position arrangement unit configured to maintain a position of the bus bar relative to the electrode terminals of the first and second battery units.

In one embodiment, the first battery unit includes a first terminal plate connected to the electrode terminal of the first battery unit, the second battery unit includes a second terminal plate connected to the electrode terminal of the second battery unit, and the bus bar is welded to the first and second terminal plates.

In one embodiment, the position arrangement unit includes at least one guide portion protruding from a surface of at least one terminal plate of the first and second terminal plates in a first direction and extending in a second direction along at least one side of the at least one terminal plate, and the bus bar includes at least one portion overlapping the surface of the at least one terminal plate adjacent the at least one guide portion.

The at least one guide portion may include at least one bent portion covering at least a portion of the bus bar. In one embodiment, a thickness of the bus bar may be substantially the same as a height of the at least one guide portion. In another embodiment, a thickness of the bus bar is greater than a height of the at least one guide portion. The bus bar may be welded to the at least one guide portion.

In one embodiment, the bus bar includes a body portion including the at least one portion of the bus bar; and a step portion overlapping the at least one guide portion. The step portion may be welded to the at least one guide portion.

In one embodiment, the bus bar is welded to the at least one guide portion along at least one weld line extending in the second direction.

In one embodiment, the position arrangement unit includes a first guide portion protruding from a surface of the first terminal plate in a first direction and extending in a second direction along a first side of the first terminal plate; and a second guide portion protruding from the surface of the first terminal plate in the first direction and extending in the second direction along a second side of the first terminal plate opposite the first side, and the bus bar includes a first portion overlapping the surface of the first terminal plate between the first and second guide portions. At least one of the first and second guide portions may include a bent portion covering at least a portion of the bus bar.

The position arrangement unit may further include a third guide portion protruding from a surface of the second terminal plate in the first direction and extending in the second direction along a first side of the second terminal plate; and a fourth guide portion protruding from the surface of the second terminal plate in the first direction and extending in the second direction along a second side of the second terminal plate opposite the first side of the second terminal plate, and the bus bar may include a second portion overlapping the surface of the second terminal plate between the third and fourth guide portions. The first portion of the bus bar may be welded to the surface of the first terminal plate, and the second portion of the bus bar may be welded to the surface of the second terminal plate. The first portion of the bus bar may include a first metal, and the second portion of the bus bar may include a second metal different from the first metal. A width of the first portion of the bus bar may be substantially the same as a distance between the first and second guide portions.

In one embodiment, the position arrangement unit includes a first guide portion protruding from a surface of the first terminal plate in a first direction and extending in a second direction along a first side of the bus bar; and a second guide portion protruding from a surface of the second terminal plate in the first direction and extending in the second direction along a second side of the bus bar opposite the first side, and the bus bar overlaps the surfaces of the first and second terminal plates and is between the first and second guide portions. At least one of the first and second guide portions may include a bent portion covering at least a portion of the bus bar.

In one embodiment, the position arrangement unit includes a first guide portion protruding from a surface of the first terminal plate in a first direction and extending in a second direction along a side of the bus bar; and a second guide portion protruding from a surface of the second terminal plate in the first direction and extending in the second direction along the side of the bus bar, and the bus bar overlaps the surfaces of the first and second terminal plates, the side of the bus bar being adjacent the first and second guide portions. At least one of the first and second guide portions may include a bent portion covering at least a portion of the bus bar.

According to another aspect of embodiments of the present invention, in a battery module in which a plurality of batteries are connected, a position arrangement unit is used to regulate a position where the bus bars for electrically connecting adjacent batteries are assembled and, thus, correct positions of the bus bars are maintained and welding efficiency is improved when the bus bars are welded.

The above and other features and advantages will become more apparent to those of ordinary skill in the art by describing in detail some exemplary embodiments of the present invention with reference to the attached drawings. Moreover, additional aspects and/or advantages of embodiments of the present invention are set forth in the following description and accompanying drawings, or may be obvious in view thereof to those skilled in the art.

DESCRIPTION OF REFERENCE NUMERALS INDICATING SOME ELEMENTS IN THE DRAWINGS

Figure 1:
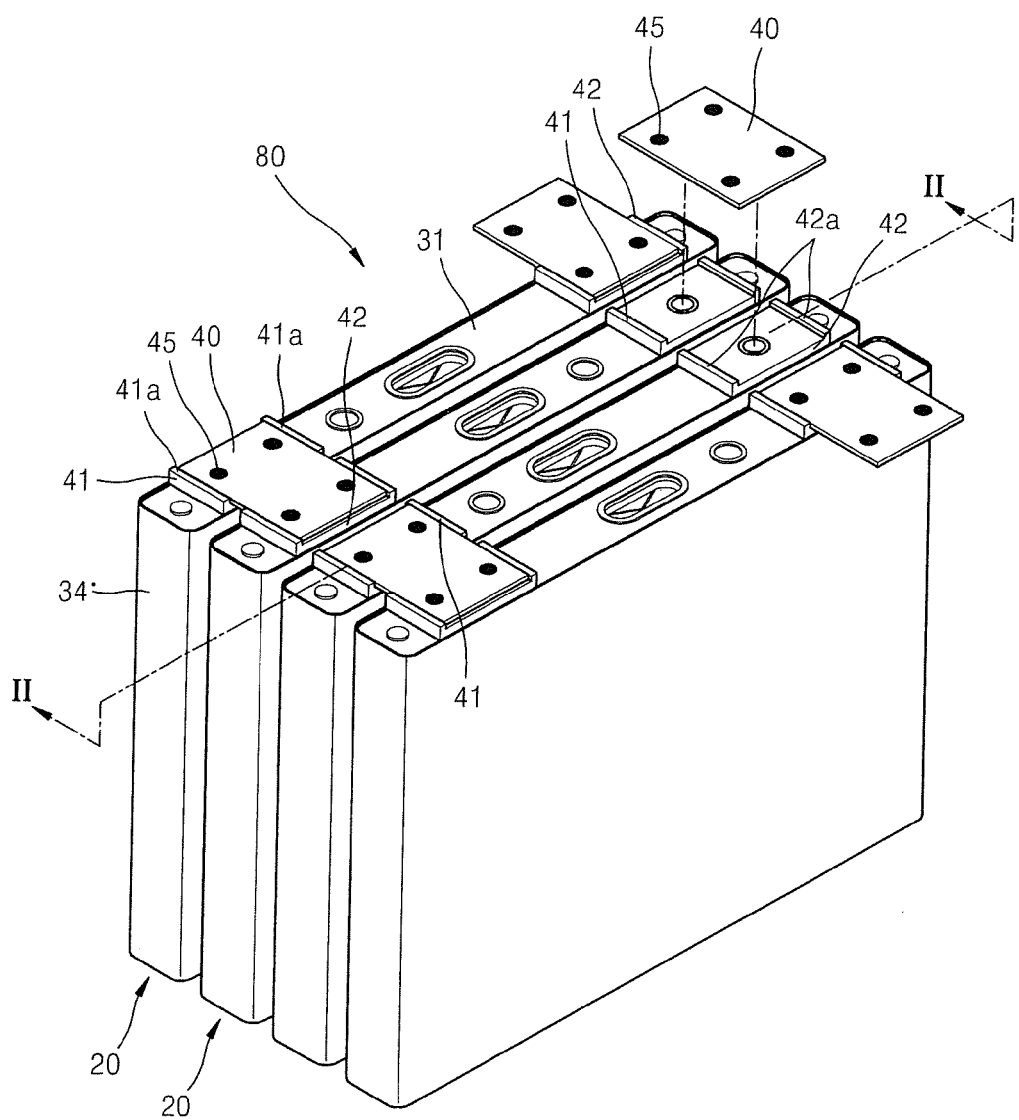
FIG. 1 is a perspective view of a battery module according to an embodiment of the present invention.

10: electrode assembly
11a: positive current collector
11c: positive electrode uncoated part
12: negative plate
12b: negative active material layer
12c: negative electrode uncoated part
13: separator 11: positive plate
11b: positive active material layer 12a: negative current collector 20: battery unit 21: positive electrode terminal
21a: leading edge of the positive electrode terminal
22: negative electrode terminal
22a: leading edge of the negative electrode terminal
25: upper gasket
27: lower gasket
31: cap plate
34: case
38a: electrolyte injection hole
40, 140, 240, 340: bus bar
41, 42, 441, 442, 541, 542, 641, 642: terminal plate
41a, 42a, 441a, 442a, 541a, 542a, 641a, 642a: guide portion
45, 245, 345: weld
50: positive electrode current collector plate
60: negative electrode current collector plate
80, 100, 200, 300, 400, 500, 600: battery module 26: insulation sealant
30: cap assembly
31': terminal hole
38: sealing pin
39: safety vent

DETAILED DESCRIPTION

Some exemplary embodiments will now be described more fully hereinafter with reference to the accompanying drawings; however, embodiments of the present invention may be embodied in different forms and should not be construed as limited to the exemplary embodiments illustrated and set forth herein. Rather, these exemplary embodiments are provided by way of example for understanding of the invention and to convey the scope of the invention to those skilled in the art. As those skilled in the art would realize, the described embodiments may be modified in various different ways, all without departing from the spirit or scope of the present invention. Like reference numerals designate like elements throughout the specification and drawings.

FIG. 1 is a perspective view of a battery module 80 according to an embodiment of the present invention. Referring to FIG. 1, the battery module 80 includes at least two battery units 20 arranged in a row. For example, the battery module 80 may include the battery units 20 arranged in a first direction or may have a structure in which the battery units 20 are arranged in a row or in two or more rows.

Secondary batteries, such as lithium ion batteries, may be used as the battery units 20. However, the present invention is not limited thereto. Various types of secondary batteries, such as cylindrical secondary batteries, quadrangular secondary battery, or polymer batteries may be used as the battery units 20.

The battery units 20, in one embodiment, are electrically connected to each other by connecting positive terminal plates 41 and negative terminal plates 42 that are formed on opposite sides of the battery units 20 via bus bars 40. For example, in one embodiment, the bus bars 40 connect pairs of adjacent battery units 20 and connect the positive terminal plates 41 and the negative terminal plates 42 on which the bus bars 40 are disposed.

According to one embodiment, the positive terminal plate 41 and the negative terminal plate 42 of each pair of connected terminal plates have opposite polarities and are formed on each of the battery units 20. A position arrangement unit is configured to maintain a position of one of the bus bars 40 relative to the positive terminal plate 41 and the negative terminal plate 42 of each pair of connected terminal plates. According to one embodiment, the position arrangement unit includes one or more guide portions 41a, 42a protruding from an end of one or both of the positive terminal plate 41 and the negative terminal plate 42. In one embodiment, the position arrangement unit includes two guide portions 41a and 42a paired to face each other and protruding from both ends of each of the positive terminal plate 41 and the negative terminal plate 42. The bus bars 40, in one embodiment, are disposed between the guide portions 41a and 42a and overlap and are welded onto the positive terminal plate 41 and the negative terminal plate 42.

For example, in the battery module 80, the battery units 20 having the same polarity may be connected in parallel or the battery units 20 having opposite polarities may be connected in series. In this regard, the battery units 20 may be arranged in different polarities.

Figure 2:
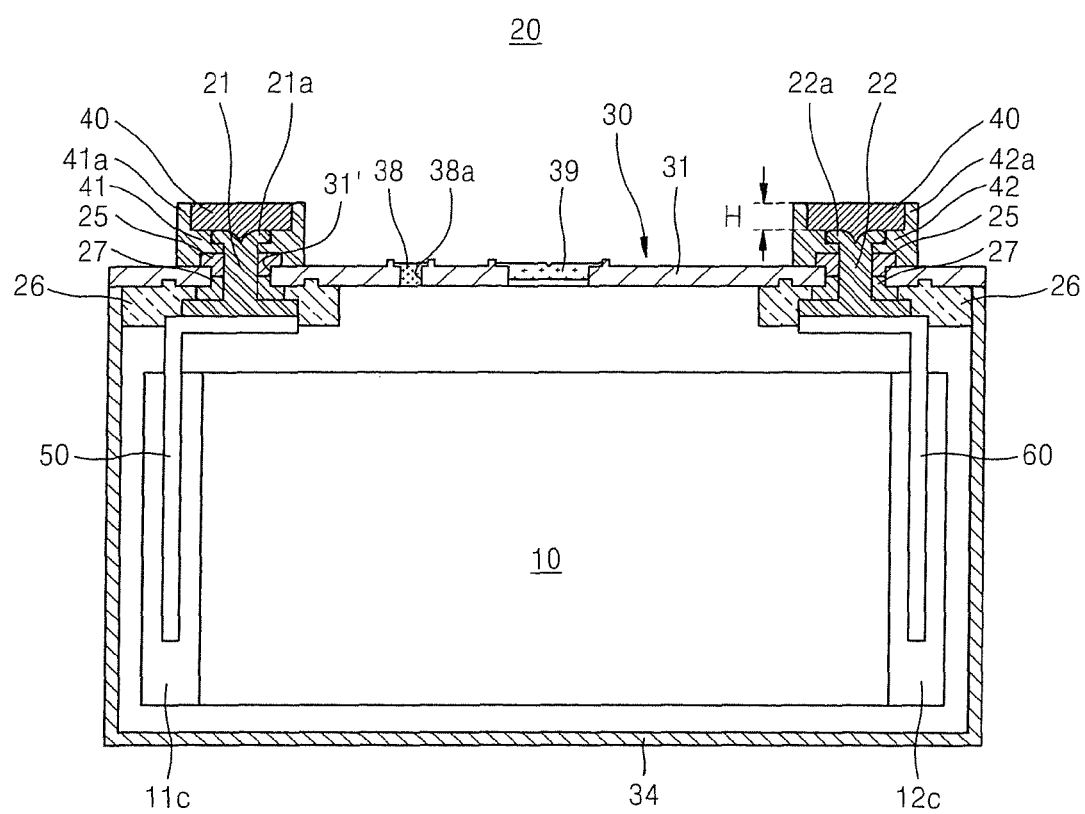
FIG. 2 is a cross-sectional view of a battery unit of the battery module of FIG. 1 taken along the line II-II.
Figure 3:
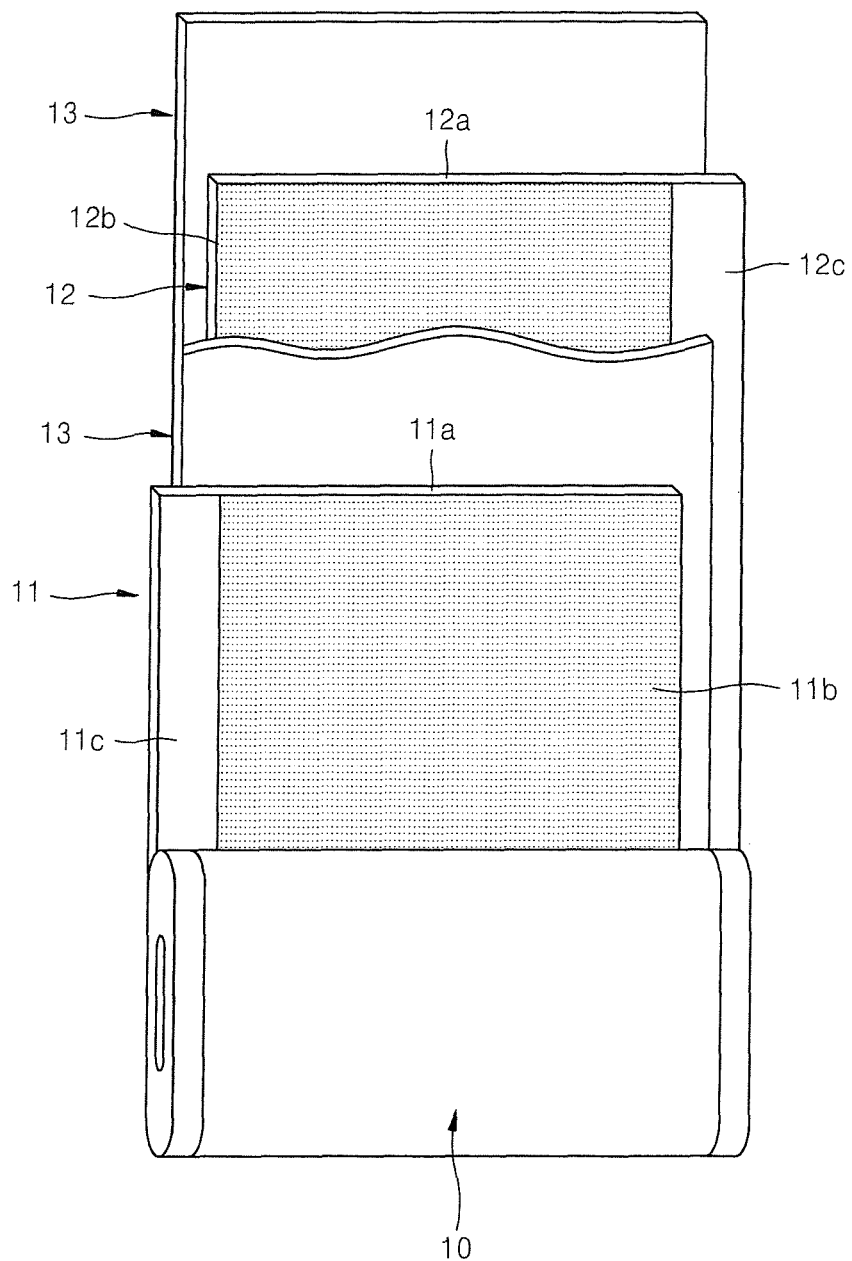
FIG. 3 is a plan view of an electrode assembly of the battery unit of FIG. 2.

FIG. 2 is a cross-sectional view of one of the battery units 20 taken along a line II-II of FIG. 1. FIG. 3 is a plan view of an electrode assembly 10 of the battery unit 20 of FIG. 2. Referring to FIGS. 2 and 3, the battery unit 20 includes the electrode assembly 10, a case 34 containing the electrode assembly 10, and a cap assembly 30 for closing an upper part of the case 34.

The electrode assembly 10, in one embodiment, includes a positive plate 11, a negative plate 12, and a separator 13 disposed between the positive plate 11 and the negative plate 12. For example, the positive plate 11, the separator 13, and the negative plate 12 may be wound in a jelly roll type structure.

The positive plate 11, in one embodiment, includes a positive current collector 11a, a positive active material layer 11b formed on at least one surface of the positive current collector 11a, and a positive electrode uncoated part 11c on which the positive active material layer 11b is not formed at one edge of the positive current collector 11a along a width direction thereof.

The negative plate 12, in one embodiment, includes a negative current collector 12a, a negative active material layer 12b formed on at least one surface of the negative current collector 12a, and a negative electrode uncoated part 12c on which the negative active material layer 12b is not formed at one edge of the negative current collector 12a along a width direction thereof.

In one embodiment, the positive electrode uncoated part 11c and the negative electrode uncoated part 12c are arranged at edges that are opposite to each other in a width direction of the electrode assembly 10, and the electrode assembly 10 is inserted into the case 34 such that the positive electrode uncoated part 11c and the negative electrode uncoated part 12c are disposed at left and right sides of the electrode assembly 10, respectively. In one embodiment, the positive electrode uncoated part 11c is electrically connected to a positive electrode current collector plate 50, and the negative electrode uncoated part 12c is electrically connected to a negative electrode current collector plate 60. Further, in one embodiment, the positive electrode uncoated part 11c is combined to the positive electrode current collector plate 50 and the negative electrode uncoated part 12c is combined to the negative electrode current collector plate 60, respectively, by ultrasonic welding.

The cap assembly 30, in one embodiment, includes a cap plate 31 that closes the upper part of the case 34. A part of the battery unit 20 where the cap plate 31 and the case 34 contact each other may be sealed by laser welding. The cap plate 31, in one embodiment, includes a safety vent 39 that may be damaged to provide a gas discharge path if an internal pressure of the case 34 exceeds a reference pressure. In one embodiment, the cap plate 31 includes an electrolyte injection hole 38a for injecting an electrolyte into the case 34, and the electrolyte injection hole 38a is closed by a sealing pin 38 after injection of the electrolyte.

The positive electrode current collector plate 50, in one embodiment, is electrically connected to a positive electrode terminal 21. The positive electrode terminal 21 may protrude through the cap plate 31 to the outside of the case 34 by a predetermined length. The negative electrode current collector plate 60, in one embodiment, is electrically connected to a negative electrode terminal 22. The negative electrode terminal 22 may protrude through the cap plate 31 to the outside of the case 34 by a predetermined length. Two terminal holes 31' may be formed in the cap plate 31 through which the positive electrode terminal 21 and the negative electrode terminal 22 protrude, respectively.

The positive electrode terminal 21 and the negative electrode terminal 22 and the cap plate 31, in one embodiment, are insulated from each other via insulation gaskets 25 and 27 disposed between the positive electrode terminal 21 and the negative electrode terminal 22 and the cap plate 31. For example, the insulation gaskets 25 and 27, in one embodiment, include the upper gasket 25 and the lower gasket 27. The upper gasket 25 is inserted into the terminal hole 31' from the upper part of the cap plate 31, and the lower gasket 27 is inserted into the terminal hole 31' from the lower part of the cap plate 31. In addition to the upper gasket 25 and the lower gasket 27, an insulation sealant 26 may be used to insulate the positive electrode terminal 21 and the negative electrode terminal 22 from the cap plate 31 or the positive electrode terminal 21 and the negative electrode terminal 22 from the case 34.

In one embodiment, the positive electrode terminal 21 is combined to the positive terminal plate 41, and the negative electrode terminal 22 is combined to the negative terminal plate 42 by rivet coupling. For example, leading edges 21a and 22a of the positive electrode terminal 21 and the negative electrode terminal 22 that are inserted into the positive terminal plate 41 and the negative terminal plate 42 may be processed into a rivet form such that the leading edges 21a and 22a extend broadly and are pressed to contact the positive terminal plate 41 and the negative terminal plate 42. That is, the positive terminal plate 41 and the negative terminal plate 42 may be pressed to contact the leading edges 21a and 22a that are processed into a rivet form such that the positive electrode terminal 21 and the positive terminal plate 41, and the negative electrode terminal 22 and the negative terminal plate 42, are firmly combined to each other, respectively. However, the present invention is not limited thereto and, in other embodiments, the positive electrode terminal 21 and the positive terminal plate 41, and the negative electrode terminal 22 and the negative terminal plate 42, may be coupled to each other by any other suitable device or method.

The pair of the positive terminal plate 41 and the negative terminal plate 42 correspond to the positive electrode terminal 21 and the negative electrode terminal 22. According to one embodiment, the guide portions 41a and 42a for arranging positions of the bus bars 40 are disposed on the positive terminal plate 41 and the negative terminal plate 42, respectively. The guide portions 41a and 42a define positions where the bus bars 40 are assembled and guide the bus bar 40 to be assembled in correct positions. The guide portions 41a and 42a, in one embodiment, regulate or maintain the positions of the bus bars 40 during a welding operation to prevent or substantially prevent the bus bars 40 from being deviated from their positions and regulate optional position movements, which improves welding operation efficiency. In addition, the guide portions 41a and 42a provide welding positions of the bus bars 40, and thus a part of a welding portion may be formed.

According to one embodiment, the guide portions 41a and 42a are paired to face each other and protrude from both ends of each of the positive terminal plate 41 and the negative terminal plate 42. The bus bars 40 are disposed between the guide portions 41a and 42a and may be supported by the guide portions 41a and 42a that regulate or restrain both sides of the bus bars 40 and maintain their correct positions. A protrusion height H (see FIG. 2) of the guide portions 41a and 42a is high enough to regulate the positions of the bus bars 40, and, in one embodiment, may be equal or about equal to a thickness of the bus bars 40, such that upper surfaces of the bus bars 40 and upper surfaces of the guide portions 41a and 42a are at a same or substantially same height.

In one embodiment, the bus bars 40 that electrically connect the positive terminal plate 41 and the negative terminal plate 42 are formed of a metal material having high conductivity and may be formed of a homogeneous metal material having a uniform composition. In one embodiment, the positive terminal plate 41 and the negative terminal plate 42 are formed of the same metal material as the bus bars 40, and each of the positive terminal plate 41 and the negative terminal plate 42 and the bus bars 40 are coupled to each other using welding between same types of metal, for example, using laser welding. An embodiment in which the positive terminal plate 41 and the negative terminal plate 42 are formed of the same type of metal is described below. According to an embodiment of the present invention, the positive terminal plate 41 and the negative terminal plate 42 that are connected through the bus bars 40 have the same electrical polarity and are formed of the same type of metal. In one embodiment, the battery units 20 are arranged in such a way that the positive terminal plates 41 having the same polarity are adjacent to each other and the negative terminal plates 42 having the same polarity are adjacent to each other.

According to another embodiment of the present invention, the positive terminal plate 41 and the negative terminal plate 42 have opposite polarities and are formed of the same type of metal. In one embodiment, the positive electrode current collector plate 50 and the negative electrode current collector plate 60 and the positive electrode terminals 21 and the negative electrode terminals 22, or the positive electrode terminals 21 and the negative electrode terminals 22 and the positive terminal plate 41 and the negative terminal plate 42, which form a current path between the positive terminal plate 41 and the negative terminal plate 42 from the electrode assembly 10, may be coupled to each other using different types of metal. For example, in one embodiment, the positive electrode current collector plate 50 and the negative electrode current collector plate 60 are formed of copper (Cu) and aluminum (Al) having different electrochemical characteristics, respectively, the positive electrode terminals 21 and the negative electrode terminals 22 are formed of the same type of material of copper (Cu) or aluminum (Al), such that one of the positive electrode current collector plate 50 and the negative electrode current collector plate 60 and one of the positive electrode terminals 21 and the negative electrode terminals 22 may be coupled to each other using different types of metal.

According to one embodiment, the positive electrode current collector plate 50 and the negative electrode current collector plate 60 are formed of copper (Cu) and aluminum (Al), respectively; the positive electrode terminals 21 and the negative electrode terminals 22 are formed of copper (Cu) and aluminum (Al), respectively; and the positive terminal plate 41 and the negative terminal plate 42 are formed of the same type of material of copper (Cu) or aluminum (Al), so that one of the positive electrode terminals 21 and the negative electrode terminals 22 and one of the positive terminal plate 41 and the negative terminal plate 42 are coupled to each other using different types of metal.

In one embodiment, friction stir welding (FSW) may be performed between different types of metal. A sufficient welding rigidity may be obtained between different types of metal through FSW. According to one embodiment, FSW is performed by rotating a friction stir welding tool at a high speed and inserting the friction stir welding tool into the bus bars 40 disposed on the positive terminal plate 41 and the negative terminal plate 42, softening peripheral materials according to a friction heat of the friction stir welding tool, and forcibly mixing materials of the positive terminal plate 41 and negative terminal plate 42 and the bus bar 40 in view of the boundary surface therebetween by a plastic flow according to a stirring action of the friction stir welding tool.

For example, sufficient welding rigidity may be obtained by performing laser welding on homogenous metals between aluminum (Al)-aluminum (Al) or copper (Cu)-copper (Cu). However, sufficient welding rigidity may not be obtainable between heterogeneous metals such as aluminum (Al)-copper (Cu) since welds may deteriorate if laser welding is performed on heterogeneous metals. Therefore, according to one embodiment of the present invention, FSW is performed on heterogeneous metals instead of laser welding to obtain sufficient welding rigidity.

For example, the positive electrode terminals 21 and the negative electrode terminals 22 may be formed of heterogeneous metals (e.g., Cu—Al), and the positive terminal plate 41 and the negative terminal plate 42 may also be formed of heterogeneous metals (e.g., Cu—Al). For example, if the first terminal plate 41 is formed of copper (Cu), the second terminal plate 42 is formed of aluminum (Al), and the bus bar 40 for connecting the positive terminal plate 41 and the negative terminal plate 42 of heterogeneous metals is formed of aluminum (Al), the first terminal plate 41 formed of copper (Cu) and the bus bar 40 formed of aluminum (Al) require welding between heterogeneous metals. In the above-described embodiment, FSW may be performed.

With further reference to FIG. 1, each of the bus bars 40 is disposed on a pair of the adjacent positive terminal plate 41 and negative terminal plate 42. The guide portions 41a and 42a, in one embodiment, upwardly protrude from both ends of the adjacent positive terminal plate 41 and the negative terminal plate 42 on which the bus bars 40 are disposed. The guide portions 41a and 42a regulate the position where the bus bars 40 are assembled to prevent or substantially prevent the bus bars 40 from being deviated from their correct positions. In one embodiment, welding (e.g., friction stir welding) is performed on regions of the bus bars 40 by point welding or spot welding. The bus bars 40 are firmly fixed onto the adjacent positive terminal plate 41 and the negative terminal plate 42 via a weld 45. In one embodiment, as shown in FIG. 1, two welds 45 are formed between each of the adjacent positive terminal plate 41 and the negative terminal plate 42 and the bus bars 40. However, the present invention is not limited by the number or shape of the welds and, in other embodiments, the bus bars 40 may be welded to the adjacent positive and negative terminal plates 41, 42 using any other suitable number of welds having any other suitable shape or configuration. For example, in another embodiment, relatively large welding regions may be formed welding the bus bars 40 disposed on the positive terminal plate 41 and the negative terminal plate 42. For example, the welding regions may be formed by performing welding (e.g., friction stir welding) using a welding tool having a large diameter. The bus bars 40 may be firmly fixed onto the positive terminal plate 41 and the negative terminal plate 42 through the welding regions. Also, for example, in another embodiment, welding may be performed along boundaries between the guide portions 41*a* and 42*a* and the bus bars 40, such as in a continuous line. For example, welding lines may be formed along both sides of the bus bars 40 assembled between the guide portions 41*a* and 42*a*. The bus bars 40 may be firmly fixed onto the positive terminal plate 41 and the negative terminal plate 42 through the welding lines.

Figure 4:
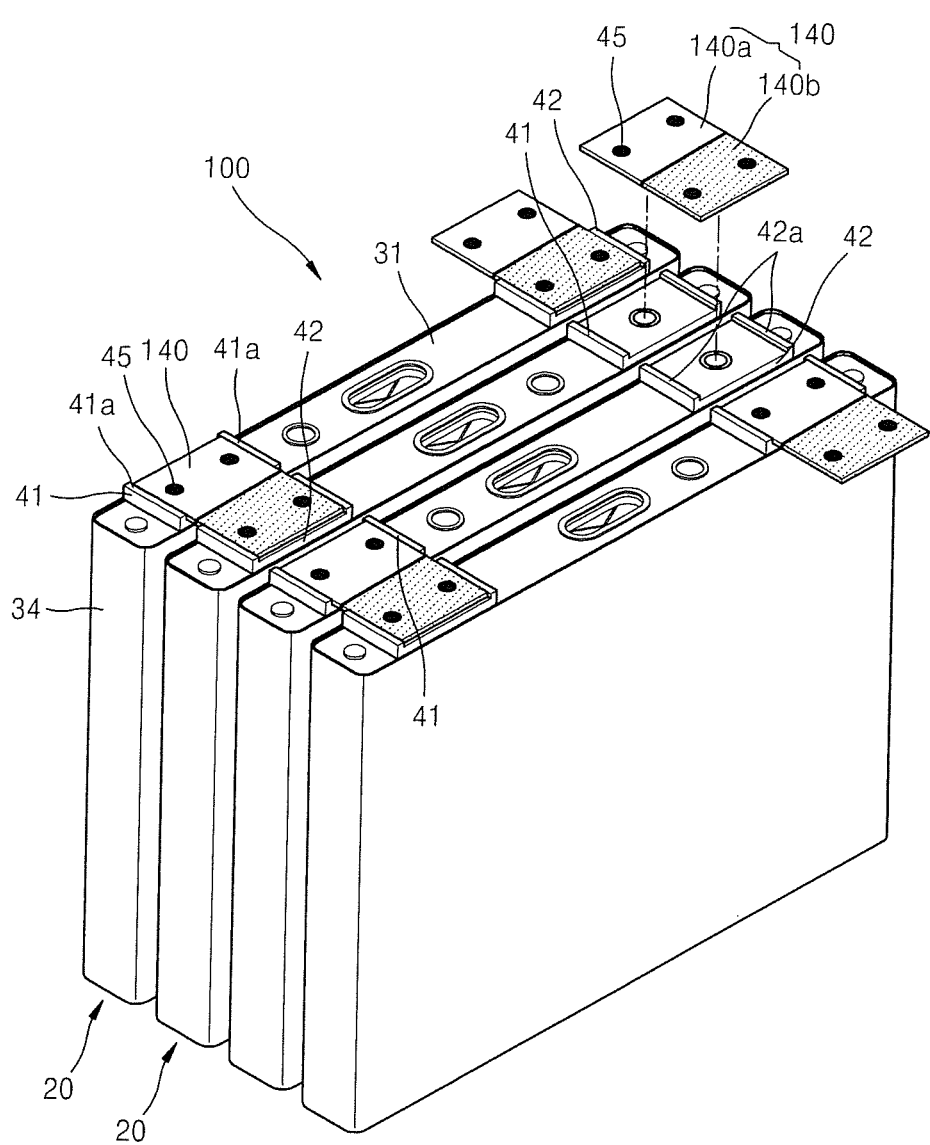
FIG. 4 is a perspective view of a battery module according to another embodiment of the present invention.

FIG. 4 is a perspective view of a battery module 100 according to another embodiment of the present invention. Referring to FIG. 4, bus bars 140 connecting the positive terminal plate 41 and the negative terminal plate 42 include an assembly between different types of metal. For example, in one embodiment, the bus bars 140 include a first metal piece 140*a* formed of a first metal material and a second metal piece 140*b* formed of a second metal material. The first and second metal pieces 140*a* and 140*b* may be coupled to each other using butt welding. In one embodiment, the first metal piece 140*a* of the bus bar 140 is welded onto the positive terminal plate 41 formed of the same metal as the first metal material, thereby obtaining a high welding rigidity between the same type of metal. Similarly, the second metal piece 140*b* of the bus bar 140 is welded onto the negative terminal plate 42 formed of the same metal as the second metal material, thereby obtaining a high welding rigidity between the same type of metal. For example, the positive terminal plate 41 and the negative terminal plate 42 may be formed of copper (Cu) and aluminum (Al) having opposite polarities and electrochemical characteristics, respectively. In this regard, the bus bars 140 that connect the positive terminal plate 41 and the negative terminal plate 42 include an assembly including the first metal piece 140*a* (e.g., a copper piece) and the second metal piece 140*b* (e.g., an aluminum piece), and welding between the same type of metal is performed. For example, in one embodiment, laser welding is performed on the bus bars 140 and each of the positive terminal plate 41 and the negative terminal plate 42.

Figure 5:
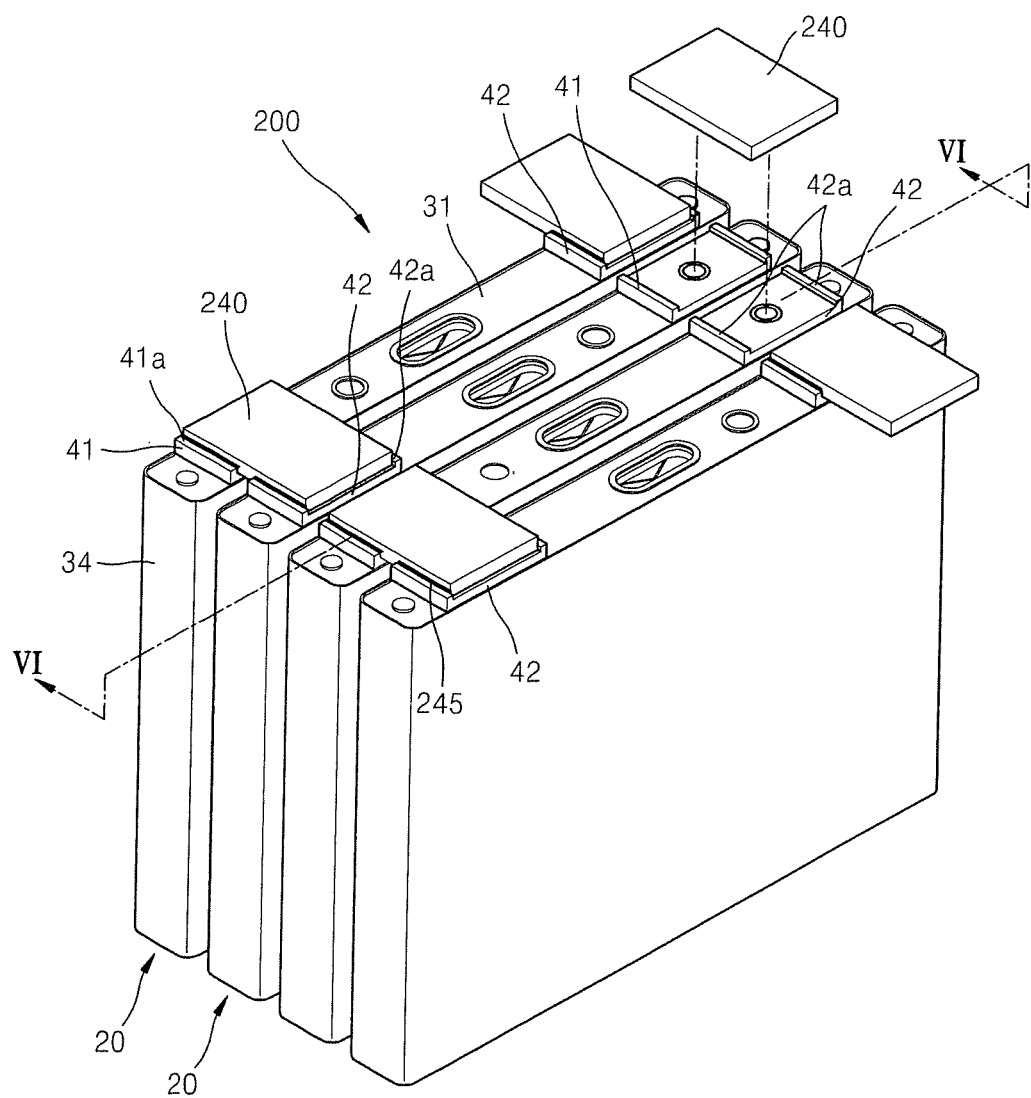
FIG. 5 is a perspective view of a battery module according to another embodiment of the present invention.
Figure 6:
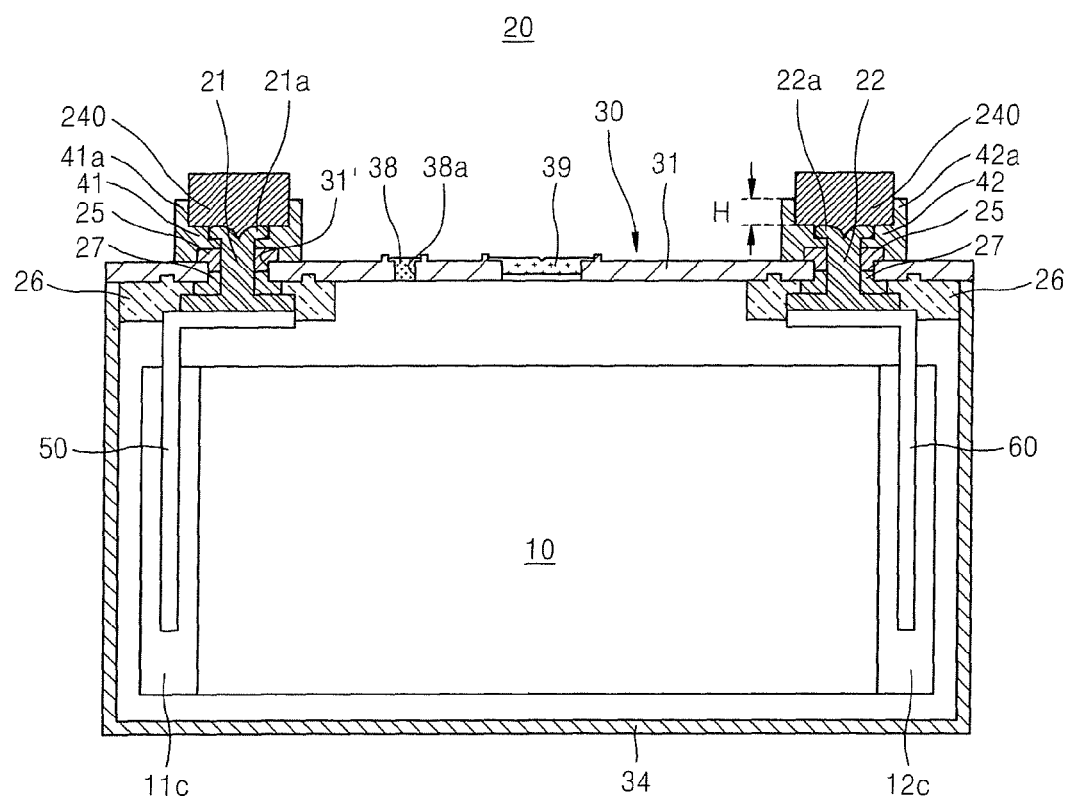
FIG. 6 is a cross-sectional view of a battery unit of the battery module of FIG. 5 taken along the line VI-VI.

FIG. 5 is a perspective view of a battery module 200 according to another embodiment of the present invention. FIG. 6 is a cross-sectional view of a battery unit of the battery module 200 taken along the line VI-VI of FIG. 5. Referring to FIGS. 5 and 6, according to one embodiment, a position arrangement unit includes the guide portions 41*a* and 42*a* upwardly protruding from both ends of the positive terminal plate 41 and the negative terminal plate 42 on which bus bars 240 are disposed. The guide portions 41*a* and 42*a* regulate the positions where the bus bars 240 are assembled to prevent or substantially prevent the bus bars 240 from being deviated from their correct positions. In one embodiment, the bus bars 240 disposed between the guide portions 41*a* and 42*a* have thicknesses exceeding the protrusion height H of the guide portions 41*a* and 42*a* (e.g., a thickness of a thick plate) and fill a space between the guide portions 41*a* and 42*a*. Since the bus bars 240 form a current path through the battery units 20 that are connected in series or in parallel to each other, the bus bars 240 having thicknesses of a thick plate may reduce a resistance of the current path. Further, in one embodiment, welding is performed to form a welding portion 245 along a corner portion where the bus bars 240 and the guide portions 41*a* and 42*a* contact each other or, alternatively, welding may be performed at another suitable portion.

Figure 7:
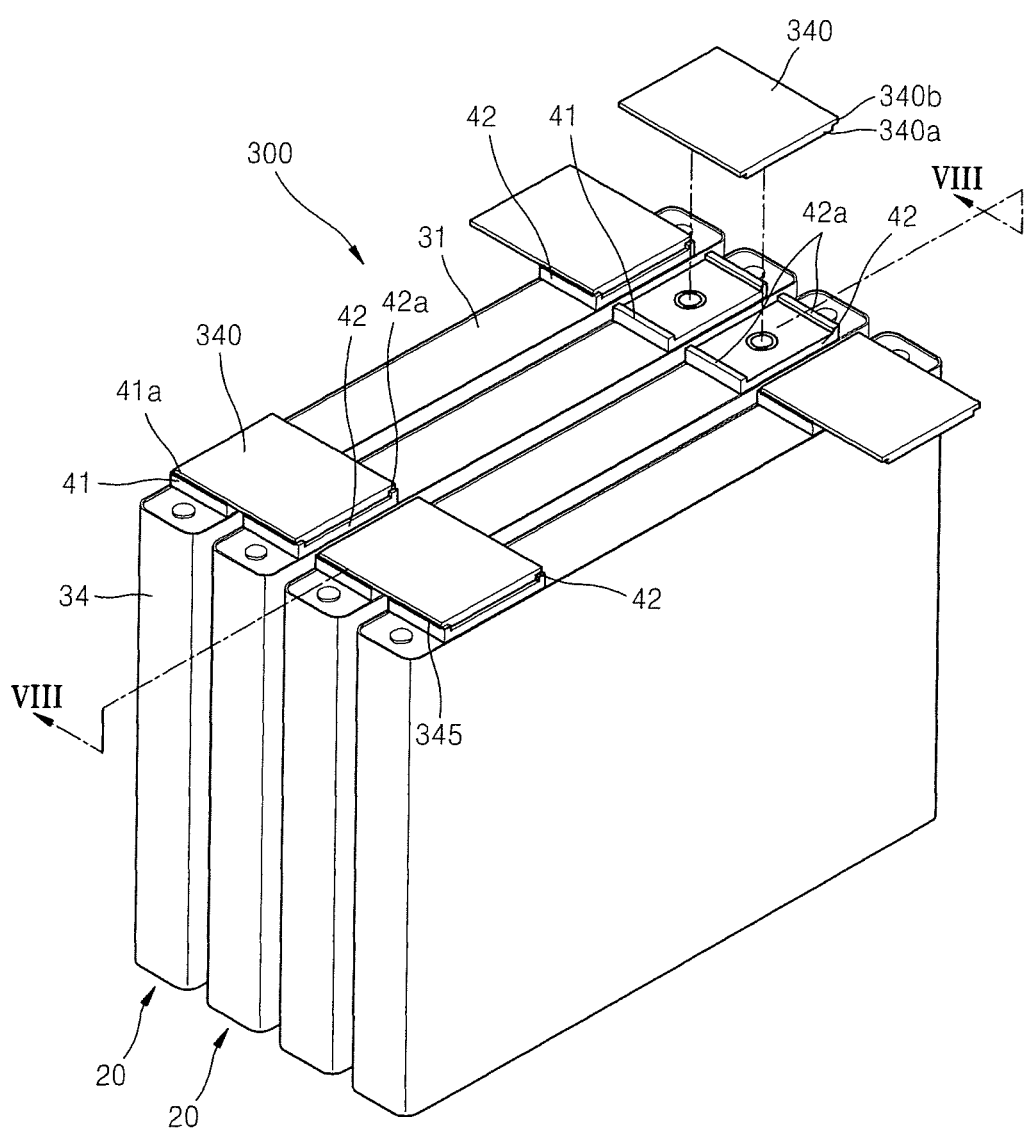
FIG. 7 is a perspective view of a battery module according to another embodiment of the present invention.
Figure 8:
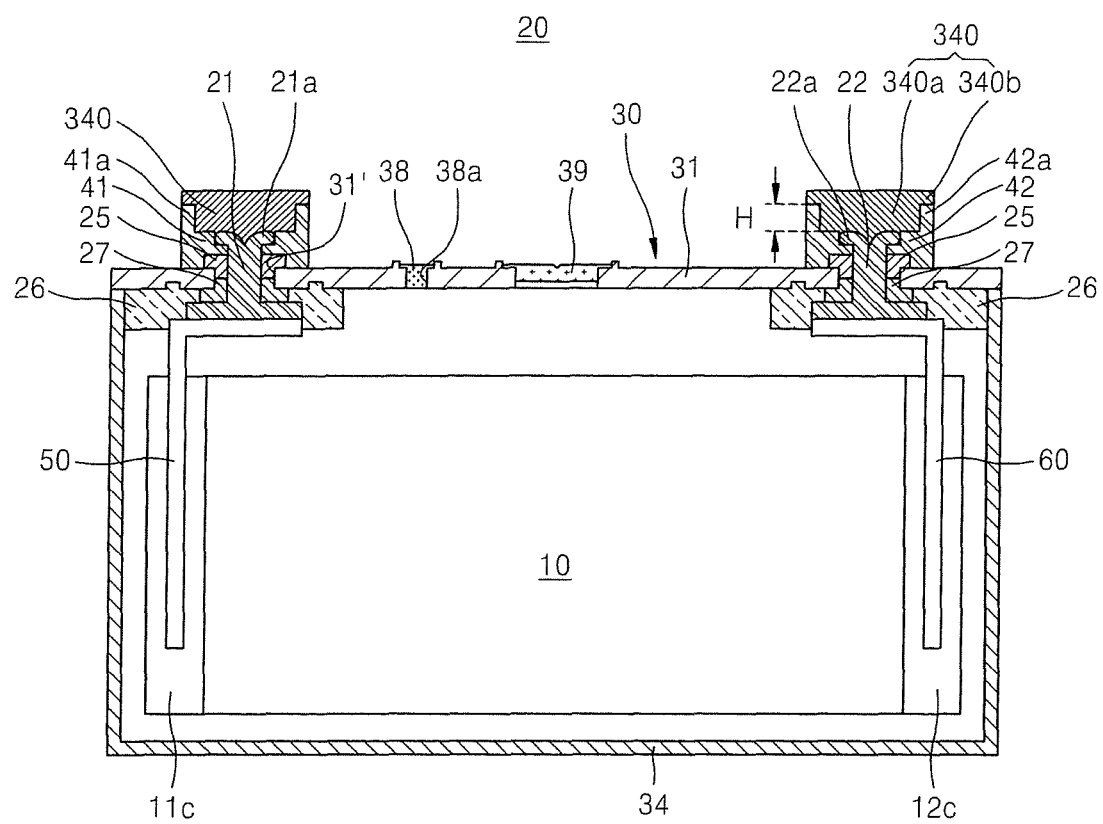
FIG. 8 is a cross-sectional view of a battery unit of the battery module of FIG. 7 taken along the line VIII-VIII.

FIG. 7 is a perspective view of a battery module 300 according to another embodiment of the present invention. FIG. 8 is a cross-sectional view of a battery unit of the battery module 300 taken along the line VIII-VIII of FIG. 7. Referring to FIGS. 7 and 8, in one embodiment, a position arrangement unit includes the guide portions 41*a* and 42*a* paired to face each other and protrude from both ends of each of the positive terminal plate 41 and the negative terminal plate 42. Bus bars 340 are arranged between the guide portions 41*a* and 42*a*. The bus bars 340, in one embodiment, cover the guide portions 41*a* and 42*a*, and may be formed, for example, having outlines matching or substantially matching outlines of the guide portions 41*a* and 42*a*. In one embodiment, the bus bars 340 include a body portion 340*a* that is inserted between the guide portions 41*a* and 42*a* and step portions 340*b* that are formed on one or both sides of the body portion 340*a* and are disposed on the guide portions 41*a* and 42*a*. In one embodiment, a welding portion 345 is formed along a portion where the step portion 340*b* and the guide portions 41*a* and 42*a* contact each other or, alternatively, welding may be performed at another suitable portion, such as on the step portion 340*b* that overlaps the guide portions 41*a* and 42*a*.

Figure 9:
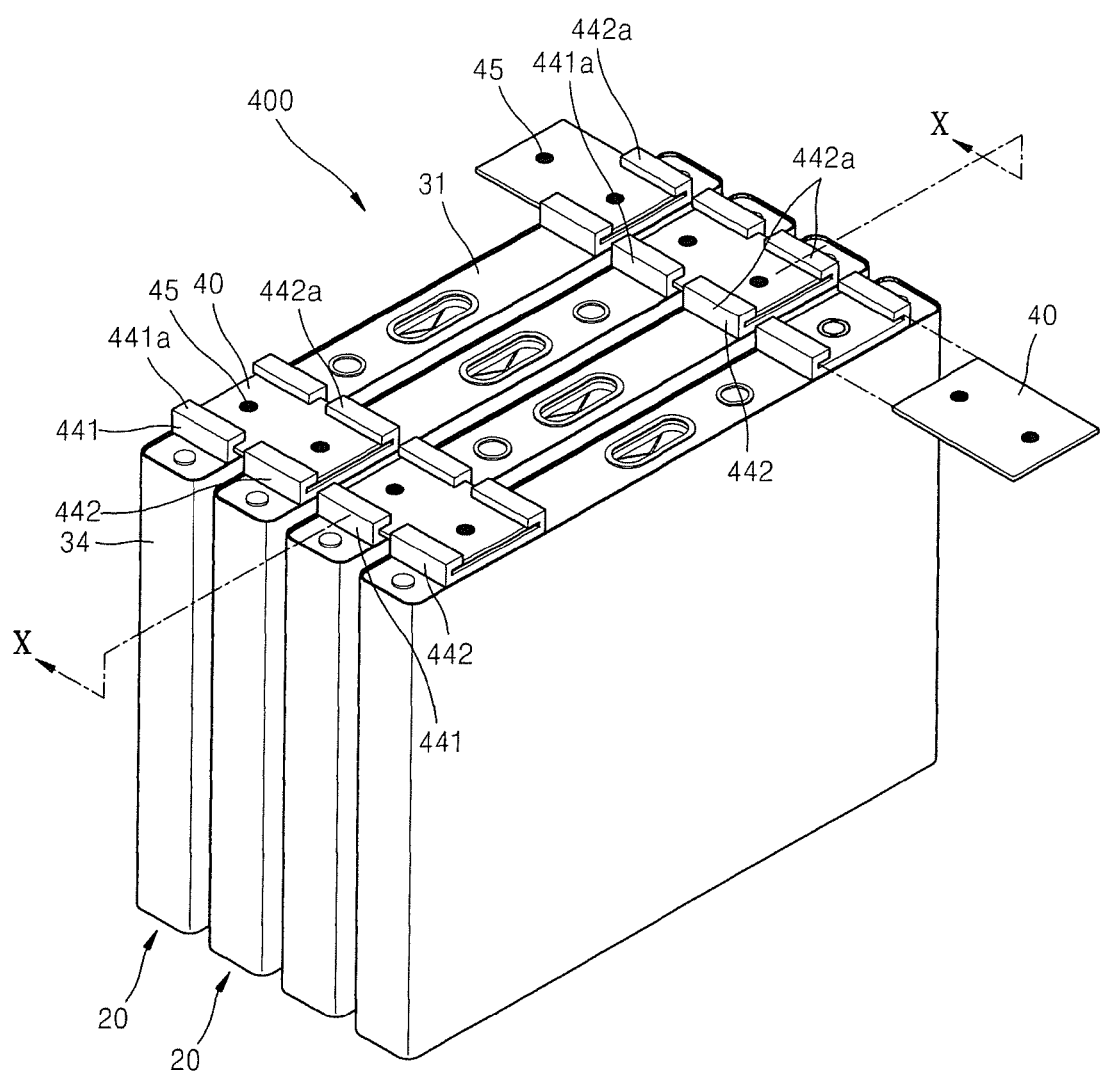
FIG. 9 is a perspective view of a battery module according to another embodiment of the present invention.
Figure 10:
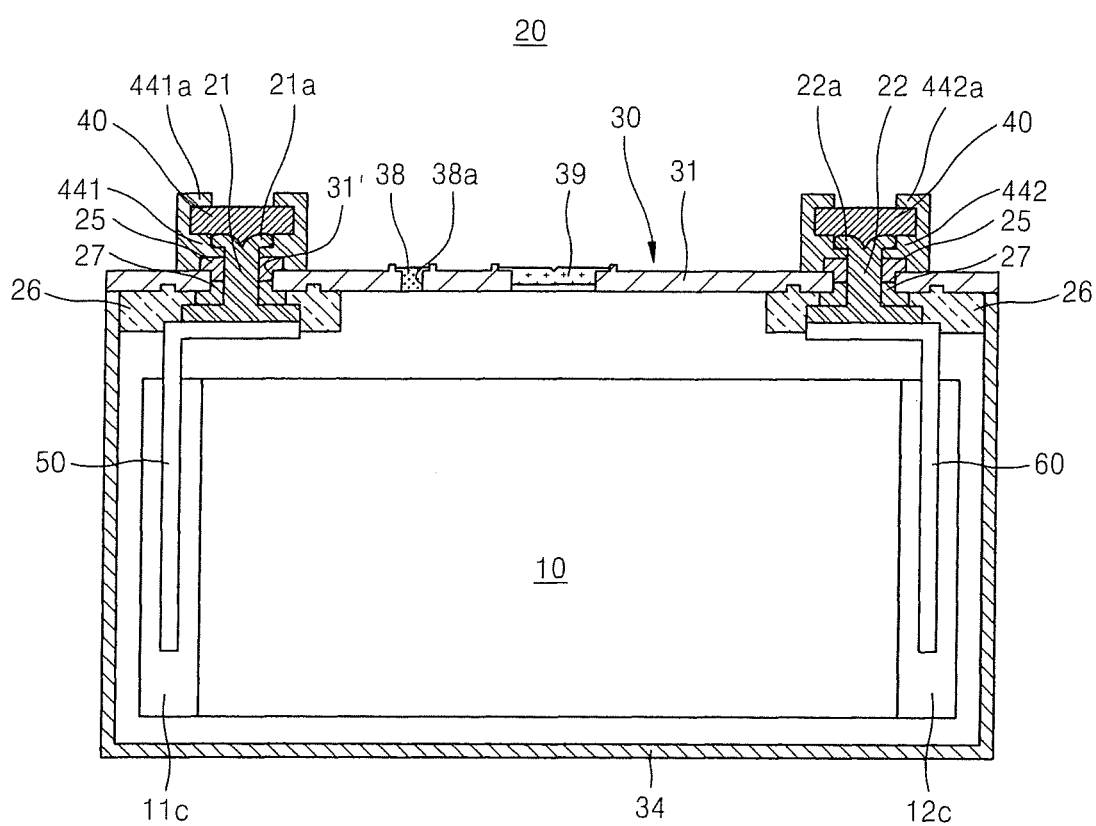
FIG. 10 is a cross-sectional view of a battery unit of the battery module of FIG. 9 taken along the line X-X.

FIG. 9 is a perspective view of a battery module 400 according to another embodiment of the present invention. FIG. 10 is a cross-sectional view of a battery unit of the battery module 400 taken along the line X-X of FIG. 9. Referring to FIGS. 9 and 10, in one embodiment, a position arrangement unit includes guide portions 441*a* and 442*a* having a bent portion (e.g., an L-shaped bent portion) for covering at least a portion of the bus bar 40. In one embodiment, the guide portions 441*a* and 442*a* are paired to face each other and protrude from both ends of each of a positive terminal plate 441 and a negative terminal plate 442, such that the guide portions 441*a* and 442*a* form an open channel shape. The bus bars 40 are arranged between the guide portions 441*a* and 442*a* and have at least a portion covered by the guide portions 441*a* and 442*a*. In one embodiment, the bus bars 40 are inserted between the guide portions 441*a* and 442*a*, such as by sliding under the bent portions of the guide portions 441*a* and 442*a*, and are covered by and contacted with the bent portions for providing low resistance between the positive and negative terminal plates 441, 442 and the bus bars 40. In one embodiment, welding portions 45 are formed between the positive and negative terminal plates 441, 442 and the bus bars 40.

Figure 11:
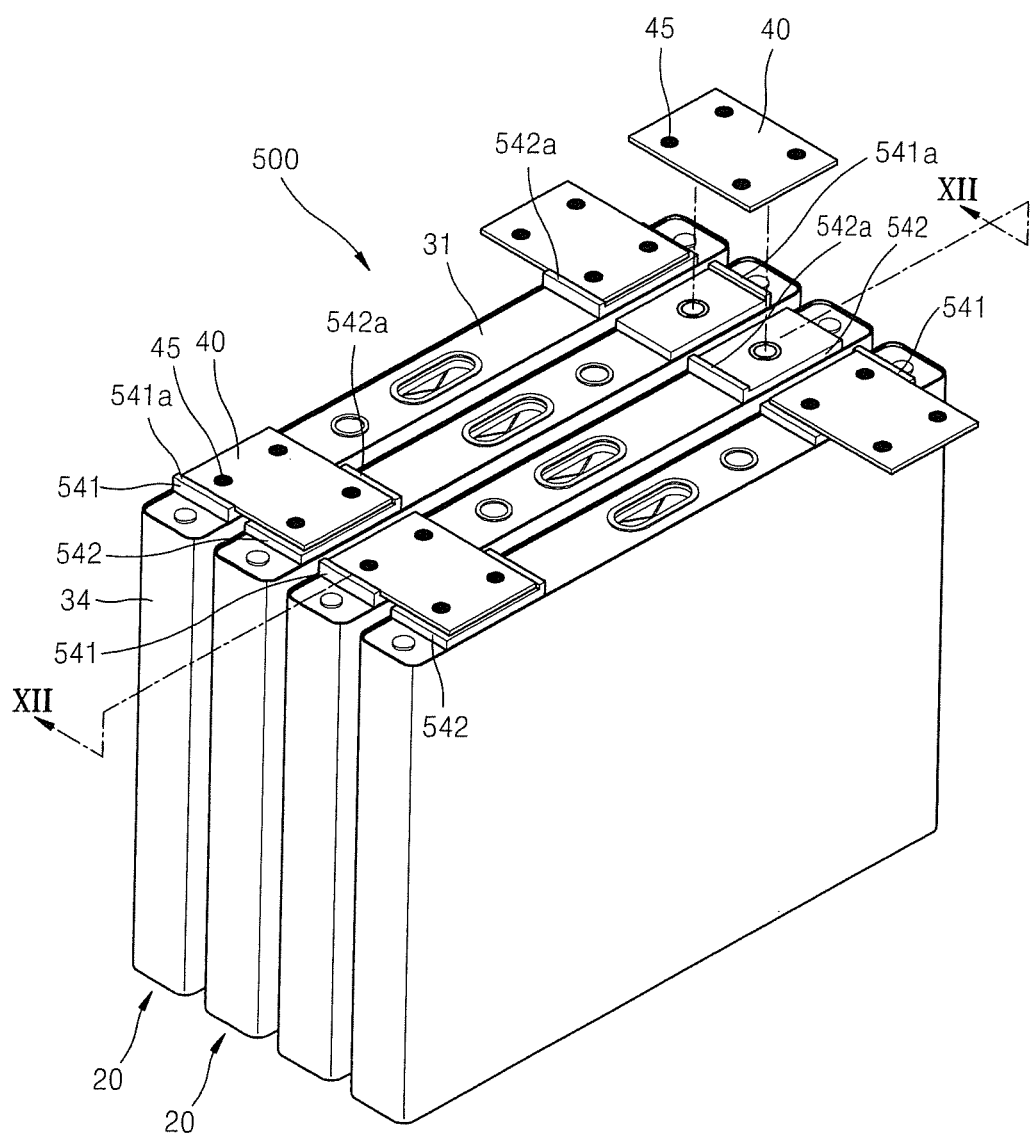
FIG. 11 is a perspective view of a battery module according to another embodiment of the present invention.
Figure 12:
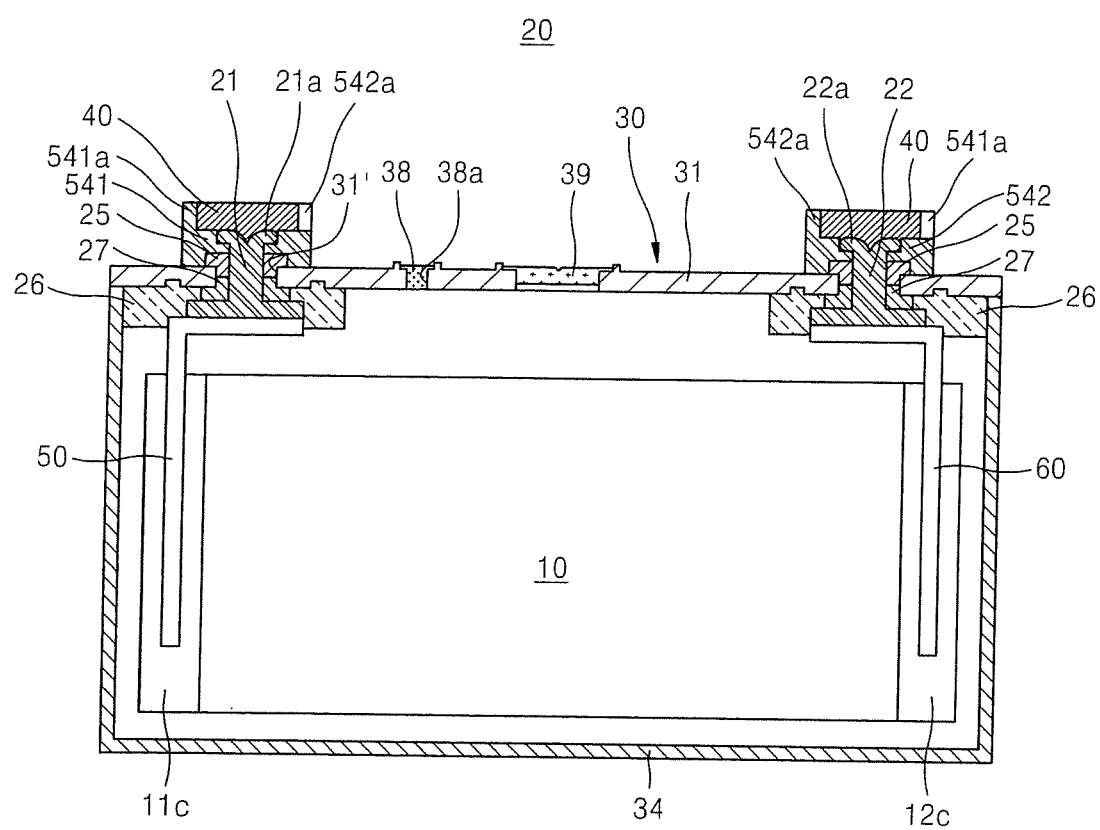
FIG. 12 is a cross-sectional view of a battery unit of the battery module of FIG. 11 taken along the line XII-XII.

FIG. 11 is a perspective view of a battery module 500 according to another embodiment of the present invention. FIG. 12 is a cross-sectional view of a battery unit of the battery module 500 taken along the line XII-XII of FIG. 11. Referring to FIGS. 11 and 12, in one embodiment, a position arrangement unit includes guide portions 541*a* and 542*a*, each of which is the same or similar to one of the guide portions 41*a* and 42*a* described above. In one embodiment, a positive terminal plate 541 has a guide portion 541*a* protruding from one end and an adjacent negative terminal plate 542 has a guide portion 542*a* protruding from an opposite end and facing the guide portion 541*a*. The bus bars 40 are arranged between the guide portions 541*a* and 542*a* on the adjacent positive and negative terminal plates 541 and 542 for maintaining a position of the bus bars 40. In one embodiment, welding portions 45 are formed between the positive and negative terminal plates 541, 542 and the bus bars 40.

Figure 13:
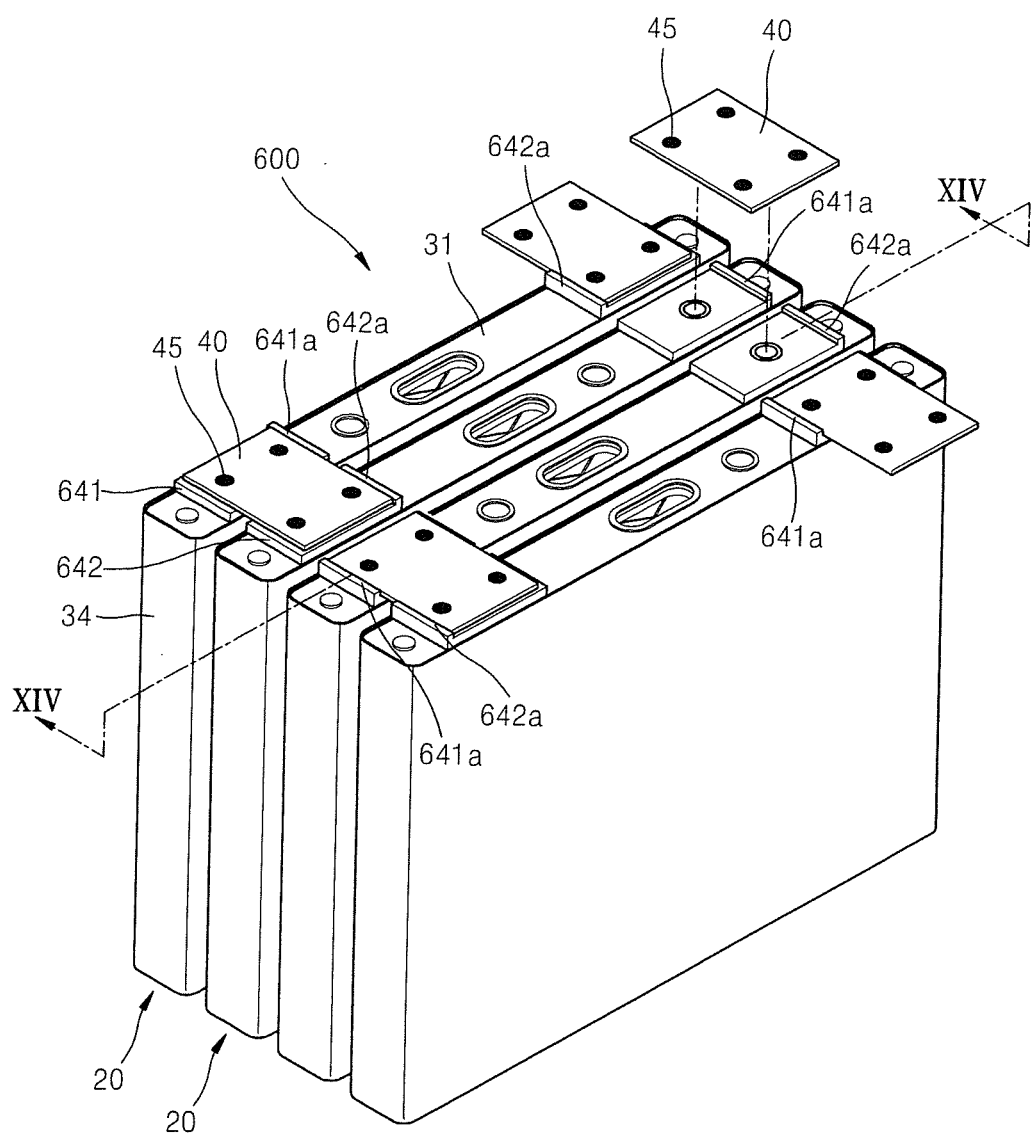
FIG. 13 is a perspective view of a battery module according to another embodiment of the present invention.
Figure 14:
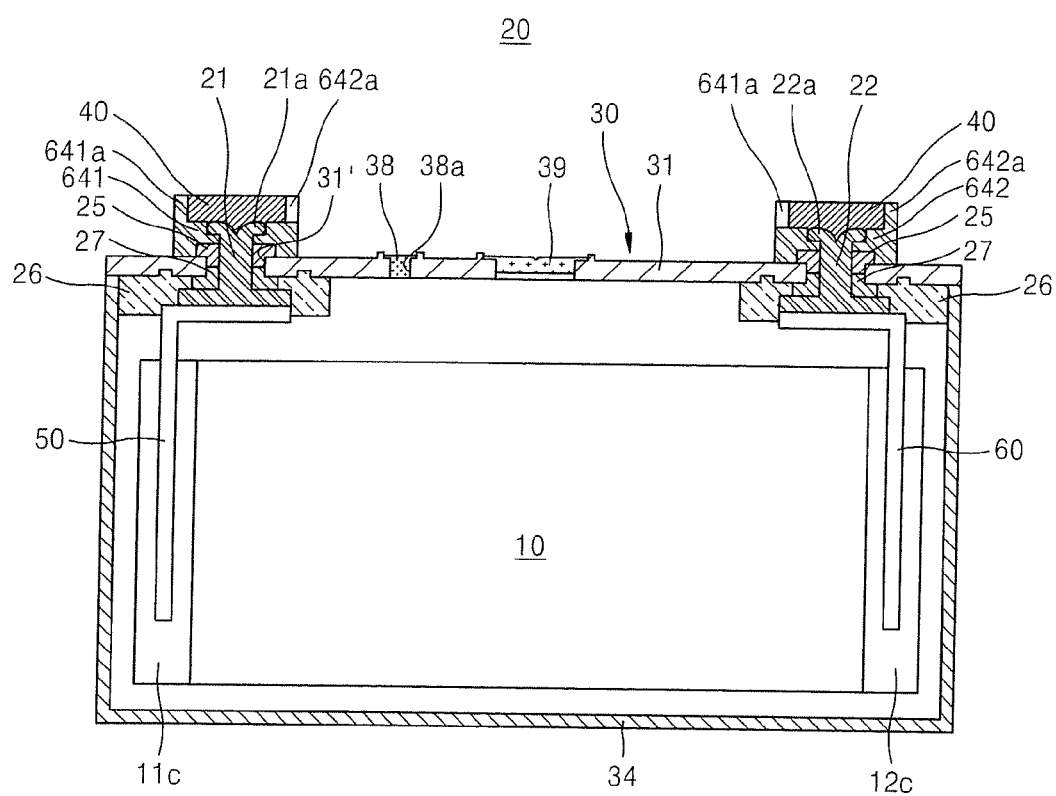
FIG. 14 is a cross-sectional view of a battery unit of the battery module of FIG. 13 taken along the line XIV-XIV.

FIG. 13 is a perspective view of a battery module 600 according to another embodiment of the present invention. FIG. 14 is a cross-sectional view of a battery unit of the battery module 600 taken along the line XIV-XIV of FIG. 13. Referring to FIGS. 13 and 14, in one embodiment, a position arrangement unit includes guide portions 641*a* and 642*a*, each of which is the same or similar to one of the guide portions 41*a* and 42*a* described above. In one embodiment, a positive terminal plate 641 has a guide portion 641a protruding from one end and an adjacent negative terminal plate 642 has a guide portion 642a protruding from a same end as the guide portion 641a. That is, the guide portions 641a and 642a are arranged adjacent to each other, and the bus bars 40 are arranged with the guide portions 641a and 642a adjacent a same side of the bus bar 40. In one embodiment, welding portions 45 are formed between the positive and negative terminal plates 641, 642 and the bus bars 40.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A battery module comprising:
a plurality of battery units, each comprising an electrode assembly and an electrode terminal electrically connected to the electrode assembly and extending through an upper surface of the respective battery unit in a first direction perpendicular to the upper surface, the plurality of battery units being arranged in a row extending in a second direction perpendicular to the first direction;
a bus bar connecting the electrode terminal of a first battery unit of the plurality of battery units and the electrode terminal of a second battery unit of the plurality of battery units; and
a position arrangement unit configured to maintain to position of the bus bar relative to the electrode terminals of the first and second battery units,
wherein the first battery unit comprises a first terminal plate connected to the electrode terminal of the first battery unit, the first terminal plate having a width in a third direction perpendicular to the first and second directions that is greater than a width in the third direction of the electrode terminal of the first battery unit such that the first terminal plate protrudes outward from the electrode terminal of the first battery unit in the third direction, the first terminal plate having a through hole through which a leading edge of the electrode terminal of the first battery unit is protruded in the first direction and exposed at an outer side of the first terminal plate facing the bus bar,
wherein the second battery unit comprises a second terminal plate connected to the electrode terminal of the second battery unit, the second terminal plate having a width in the third direction that is greater than a width in the third direction of the electrode terminal of the second battery unit such that the second terminal plate protrudes outward from the electrode terminal of the second battery unit in the third direction, the second terminal plate having a through hole through which a leading edge of the electrode terminal of the second battery unit is protruded in the first direction and exposed at an outer side of the second terminal plate facing the bus bar,
wherein the bus bar is welded to the first and second terminal plates,
wherein the position arrangement unit comprises at least one guide portion protruding from a surface of at least one terminal plate of the first and second terminal plates in the first direction and extending in the second direction along at least one side of the at least one terminal plate, and
wherein the bus bar comprises at least one portion overlapping and supported on the surface of the at least one terminal plate adjacent the at least one guide portion, the at least one guide portion extending in the second direction outside an outermost edge of the bus bar such that the at least one guide portion maintains the position of the bus bar against movement in the third direction.

2. The battery module of claim 1, wherein the at least one guide portion comprises at least one bent portion covering at least a portion of the bus bar.

3. The battery module of claim 1, wherein a thickness of the bus bar is substantially the same as a height of the at least one guide portion.

4. The battery module of claim 1, wherein a thickness of the bus bar is greater than a height of the at least one guide portion.

5. The battery module of claim 4, wherein the bus bar is welded to the at least one guide portion.

6. The battery module of claim 1, wherein, the bus bar comprises:
a body portion comprising the at least one portion of the bus bar; and
a step portion overlapping the at least one guide portion.

7. The battery module of claim 6, wherein the step portion is welded to the at least one guide portion.

8. The battery module of claim 1, wherein the bus bar is welded to the at least one guide portion along at least one weld line extending in the second direction.

9. The battery module of claim 1, wherein:
the at least one guide portion comprises:
a first guide portion protruding from a surface of the first terminal plate in the first direction and extending in the second direction along a first side of the first terminal plate; and
a second guide portion protruding from the surface of the first terminal plate in the first direction and extending in the second direction along a second side of the first terminal plate opposite the first side, and
the bus bar comprises a first portion overlapping the surface of the first terminal plate between the first and second guide portions.

10. The battery module of claim 9, wherein at least one of the first and second guide portions comprises a bent portion covering at least a portion of the bus bar.

11. The battery module of claim 9, wherein:
the at least one guide portion further comprises:
a third guide portion protruding from a surface of the second terminal plate in the first direction and extending in the second direction along a first side of the second terminal plate; and
a fourth guide portion protruding from the surface of the second terminal plate in the first direction and extending in the second direction along a second side of the second terminal plate opposite the first side of the second terminal plate, and
the bus bar comprises a second portion overlapping the surface of the second terminal plate between the third and fourth guide portions.

12. The battery module of claim 11, wherein the first portion of the bus bar is welded to the surface of the first terminal plate, and the second portion of the bus bar is welded to the surface of the second terminal plate.

13. The battery module of claim 11, wherein the first portion of the bus bar comprises a first metal, and the second portion of the bus bar comprises a second metal different from the first metal.

14. The battery module of claim 9, wherein a width of the first portion of the bus bar is the same as a distance between the first and second guide portions.

15. The battery module of claim 1, wherein:
the at least one guide portion comprises:
a first guide portion protruding from a surface of the first terminal plate in the first direction and extending in the second direction along a first side of the bus bar; and a second guide portion protruding from a surface of the second terminal plate in the first direction and extending in the second direction along a second side of the bus bar opposite the first side, and the bus bar overlaps the surfaces of the first and second terminal plates and is between the first and second guide portions.

16. The battery module of claim 15, wherein at least one of the first and second guide portions comprises a bent portion covering at least a portion of the bus bar.

17. The battery module of claim 1, wherein:
the at least one guide portion comprises:
a first guide portion protruding from a surface of the first terminal plate in the first direction and extending in the second direction along a side of the bus bar; and
a second guide portion protruding from a surface of the second terminal plate in the first direction and extending in the second direction along the side of the bus bar, and the bus bar overlaps the surfaces of the first and second terminal plates, the side of the bus bar being adjacent the first and second guide portions.

18. The battery module of claim 17, wherein at least one of the first and second guide portions comprises a bent portion covering at least a portion of the bus bar.

\* \* \* \* \*